United States Patent [19]
Williams

[11] Patent Number: 5,550,901
[45] Date of Patent: Aug. 27, 1996

[54] FULL-DUPLEX ADAPTER FOR PBX TELEPHONE SYSTEM

[75] Inventor: Arthur B. Williams, Smithtown, N.Y.

[73] Assignee: Coherent Communications Systems Corp., Leesburg, Va.

[21] Appl. No.: 295,019

[22] Filed: Aug. 24, 1994

[51] Int. Cl.⁶ .............................................. H04M 11/00
[52] U.S. Cl. .................. 379/93; 379/98; 379/100
[58] Field of Search .................. 379/93, 94, 96, 379/97, 98, 219, 225, 229, 230, 231, 232, 234, 100

[56] References Cited

U.S. PATENT DOCUMENTS

| | | |
|---|---|---|
| 3,715,513 | 2/1973 | Miller . |
| 3,824,347 | 7/1974 | Sorber et al. ............................... 379/97 |
| 3,914,559 | 10/1975 | Knollman . |
| 4,088,844 | 5/1978 | Kinnaird, Jr. . |
| 4,689,814 | 8/1987 | Warner, II ................................... 379/93 |
| 4,759,059 | 7/1988 | Christensen .............................. 379/101 |
| 4,788,720 | 11/1988 | Brennan et al. . |
| 4,914,690 | 4/1990 | Hagedorn ............................... 379/233 |
| 4,987,586 | 1/1991 | Gross et al. ............................... 379/93 |
| 5,003,580 | 3/1991 | Duong et al. ............................. 379/93 |
| 5,097,501 | 3/1992 | Kutzavitch .............................. 379/165 |
| 5,237,605 | 8/1993 | Peak et al. ............................... 379/399 |

Primary Examiner—Jason Chan
Attorney, Agent, or Firm—Dann, Dorfman, Herrell and Skillman, P.C.

[57] ABSTRACT

An adapter for interconnecting a tip-ring telephone, a PBX telephone, and a private branch exchange (PBX) is configured to pass out-of-band signals between the PBX telephone and the PBX and to attenuate voice-band signals therebetween when the tip-ring telephone is being used. The adapter includes a band-reject filter and a switching mechanism for connecting the band-reject filter between the PBX telephone and the tip-ring telephone.

33 Claims, 3 Drawing Sheets

FULL-DUPLEX ADAPTER FOR PBX TELEPHONE SYSTEM

FIELD OF THE INVENTION

The present invention relates to an interface between a telephone set and a private-area branch exchange (PABX or PBX) telephone system. More particularly, the invention relates to an adapter for interconnecting a tip-ring telephone or similar apparatus in tandem with a PBX telephone wherein out-of-band signaling is conducted between the PBX telephone and the PBX system, while speech-band signaling between the PBX telephone and the PBX system is attenuated.

BACKGROUND OF THE INVENTION

PBX systems are widely used, for example, for office telephone systems wherein the private exchange provides a number of users access to one or more outside telephone trunk lines. Telephones specifically adapted for use in a PBX system, hereinafter "PBX telephones", are often designed to provide such features as speed-dialing, conferencing, last number redial, call forwarding, and other desirable features that are not ordinarily provided by a standard telephone. In order to effectuate such features, a signaling channel is provided between each of the PBX telephones and the private exchange. In some PBX systems, the signaling channel is realized by a separate conductor pair that is connected in parallel with a standard tip-ring wire pair between the PBX telephone and the private exchange. In other PBX systems, the signaling channel is provided directly along the tip-ring wire pair by amplitude modulated tones that are outside of the voice band.

For example, in one known PBX system, signaling between the private exchange and each of the PBX telephones is provided at 8 kHz. In another PBX system, signaling is provided at 32 kHz. Such tones are easily distinguished from speech signals by the private exchange, since the standard telephone voice band is ordinarily located between about 300 Hz and about 3500 Hz.

There are a variety of signaling protocols between private exchanges and their associated PBX telephones which are often proprietary in nature. Users of such systems are ordinarily required to use only those PBX telephones that are specifically designed to be compatible with their selected PBX system. A distinct inconvenience of that requirement results from the fact that the conferencing, or hands-free, operation of PBX telephones usually relies upon a voice-switching circuit for preventing undesirable feedback between the loudspeaker and the microphone, which would otherwise result in howling or echo. Such voice-switching circuits introduce undesirable effects such as sentence clipping and an inability to conduct simultaneous two-way, or full-duplex, voice communication.

Digital echo cancellation has made it possible to construct conferencing telephones that can provide high quality, full-duplex voice communication. In a telephone employing digital echo cancellation, a transversal filter is connected between the incoming and outgoing signal paths. The filter performs a convolution of the incoming signal with the transfer function between the loudspeaker and the microphone. The resulting signal is subtracted from the outgoing signal so that the incoming signal as reproduced by the loudspeaker is substantially canceled from the outgoing signal produced by the microphone. One such full-duplex conference telephone is the CONFERENCEMASTER telephone, manufactured by Coherent Communications Systems Corporation of Hauppauge, New York, assignee of the present application.

Because of the manufacturing difficulties of producing many different models of full-duplex conference telephones that are each adapted to function compatibly with a particular proprietary PBX system, it would be desirable to provide an adapter that allows a user to connect a full-duplex conferencing telephone, having a standard tip-ring interface, in tandem with the user's PBX telephone. It would be desirable for such an adapter to maintain the signaling channel between the PBX telephone and the private exchange, while also effectively attenuating voice band signals between the PBX telephone and the private exchange. Voice-band attenuation would be desirable so that any voice signals picked up by the microphone of the PBX telephone do not interfere with the echo cancellation function provided by the full-duplex conferencing telephone. Additionally, it would be desirable to configure such a device, or the conferencing telephone, so that out-of-band signals (i.e., signals with frequencies outside the voice band) along the tip-ring connection between the PBX telephone and the private exchange are not reproduced by the loudspeaker of the conferencing telephone.

Interface devices for connecting standard telephones to PBX systems are described in U.S. Pat. Nos. 4,759,054 and 5,097,501. The interface devices described in those patents are designed to connect to PBX systems wherein signaling is conducted along a conductor pair that is separate from the tip-ring conductor pair. Hence, those devices do not provide for attenuating or blocking out-of-band signals between the standard telephones and the private exchange. Additionally, both of the systems described in the aforementioned patents allow simultaneous use of the PBX telephones and the standard telephones, and would therefore interfere with the echo cancellation function of a full-duplex conferencing telephone.

U.S. Pat. No. 4,088,844 describes an interface circuit for a tip-ring telephone, which provides the signaling function of a PBX telephone, so that the tip-ring telephone can be connected to a private exchange. In order to employ such interface circuitry to connect a full-duplex conference telephone to a PBX system, it would be necessary to produce such interface circuitry in a number of different configurations to provide compatibility with the variety of known PBX systems. Additionally, the user is then deprived of the numerous additional features provided by the PBX telephone.

U.S. Pat. No. 5,237,605 relates to a tip-ring telephone having an internal module that provides a separate PBX connection. As in the case of U.S. Pat. No. 4,088,884, the incorporation of such a module into a full-duplex conference telephone would require a variety of different configurations to correspond to the variety of known PBX systems.

SUMMARY OF THE INVENTION

According to one aspect of the present invention, an adapter circuit is provided which allows a telephone having a tip-ring interface to be connected in a PBX system, in tandem with a PBX telephone. The adapter circuit maintains a signaling channel between the PBX telephone and the private exchange, while attenuating voice-band signals between the PBX telephone and the private exchange. Within the adapter circuit, the tip-ring connection from the tip-ring telephone is connected to corresponding conductors of the PBX system so that voice-band signals are provided from the tip-ring telephone to the private exchange in place of the voice-band signals from the PBX telephone.

According to another aspect of the invention, a universal adapter circuit is provided which allows a full-duplex conference telephone to be connected to any PBX telephone system which uses out-of-band or separate conductor signaling channels. The adapter circuit allows high-quality, full-duplex conversation to be provided by the full-duplex conference telephone while allowing the user to access supplemental features of the PBX system via the PBX telephone.

According to another aspect of the invention, an adapter device is provided for connecting two telephone devices with a communication system. The device includes a filter for selectively attenuating signals from one of the telephone devices and for substituting signals from the other telephone in place of the attenuated signals in order to produce a composite signal that is provided to the communication system.

DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE INVENTION

Figure 1:
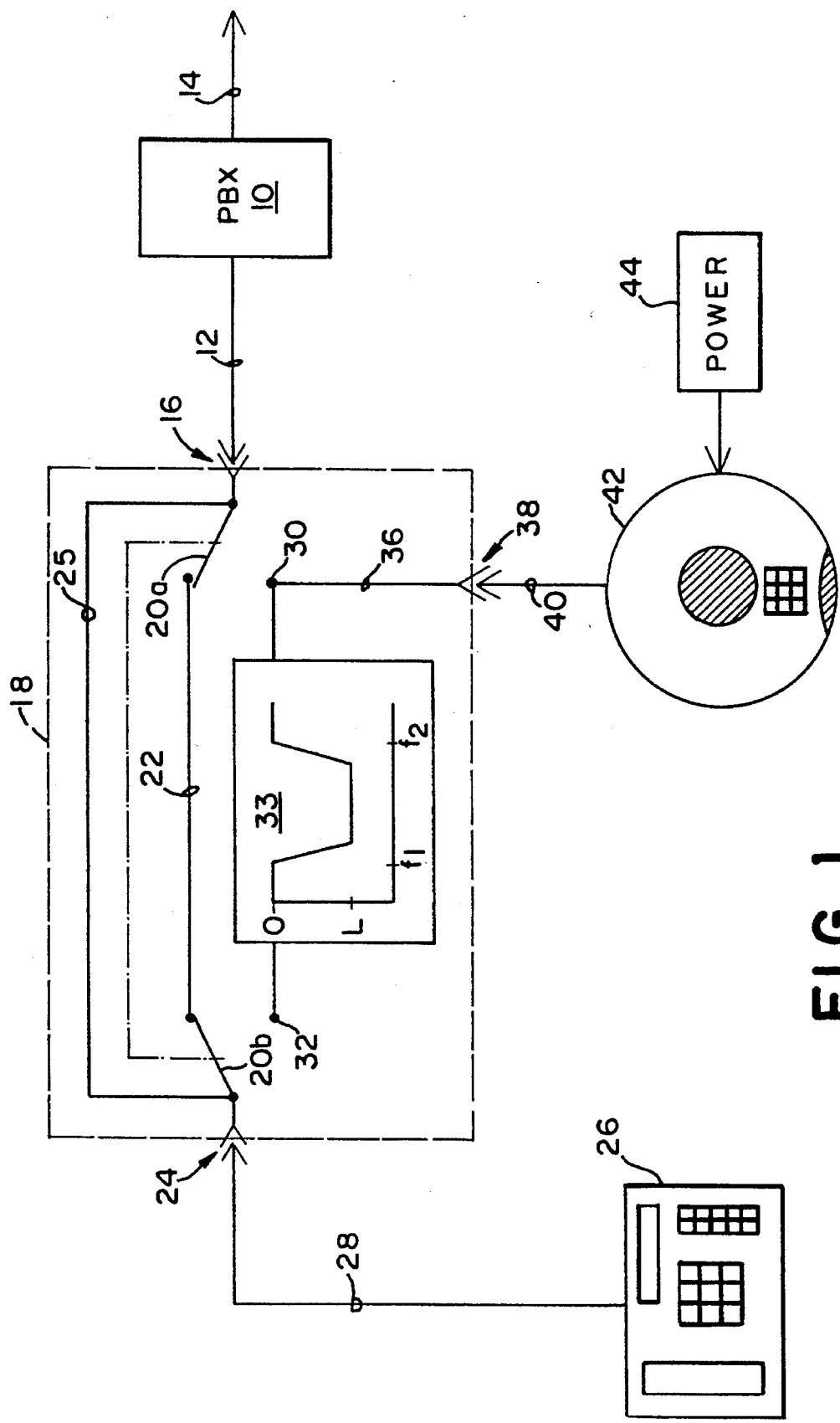
FIG. 1 is a functional block diagram of a PBX system employing an adapter in accordance with the present invention.

Referring now to FIG. 1, there is shown a private branch exchange or PBX 10. The exchange 10 provides local switching and call supervision between a PBX line 12 and an outside telephone line 14 which is typically connected to a central office of a telephone network. An adapter circuit 18 is connected between exchange 10, a PBX telephone 26 and a tip-ring type conferencing telephone 42. The adapter circuit 18 may be disposed in a separate housing (not shown) from the PBX telephone and the tip-ring conferencing telephone or, alternatively, may be housed within one of the PBX telephone and the conferencing telephone.

Adapter 18 includes terminals 16, 24, and 38; a switching mechanism, and a band-reject filter 33. The PBX line 12 from the exchange 10 is connected to terminal 16 of adapter circuit 18. As described more fully hereinbelow, a conductor from terminal 16 is connected to switch 20a. When switch 20a is in the position shown in FIG. 1, hereinafter referred to as the "normal position", one of the conductors of PBX line 12 is connected, via conductor 22 and switch 20b, to terminal 24. PBX telephone 26 is connected to terminal 24 via signal line 28, so that with switch 22 in the normal position, a fully operative connection is established between the PBX telephone 26 and the exchange 10 for conducting voice-band conversation and for maintaining a feature signaling channel.

The PBX telephone 26 can be of the type that maintains a signaling channel with the exchange 10 using out-of-band tones along the tip and ring conductors of the connection therebetween. Alternatively, the PBX telephone 26, can be of the type which maintains a signaling channel with the exchange 10 along conductors other than the tip and ring conductors.

Switches 20a and 20b are ganged so that they operate simultaneously. For example, when switch 20a is positioned to connect with contact 30 of the adapter 18, switch 20b is simultaneously positioned to connect to contact 32. In that position, hereinafter referred to as the "conference position", the band-reject filter 33 is connected between the tip and ring conductors of the PBX telephone 26 and the corresponding conductors of signal line 12 leading to the exchange 10. Other conductors, if any, within line 28 from the PBX telephone 26, are connected directly through adapter 18 with corresponding conductors of line 12 via jumpers 25. In that manner, connection between those other conductors is maintained regardless of the position of switches 20a and 20b.

The band-reject filter 33 is designed to attenuate voice-band signals along the tip and ring conductors between terminals 24 and 38. Such attenuation is effected by designing the band-reject filter 33 to provide a degree of attenuation or loss, L, between two predetermined corner frequencies $f_1$ and $f_2$ defining the voice band. In the range below $f_1$ and in the range above $f_2$, the band-reject filter 33 does not substantially attenuate signals. The frequencies $f_1$ and $f_2$ may define the standard telephone band from about 300 Hz to 3500 Hz, or an extended band of from about 30 Hz to 3500 Hz.

Other arrangements of the band-reject filter are possible provided that DC conduction is maintained between the PBX telephone 26 and the exchange 10 and that out-of-band signals between the PBX telephone 26 and the exchange 10 are not substantially attenuated. Additionally, for reasons described hereinbelow, it is desirable that the band-reject filter 33 provide a high input impedance at terminal 38, within the rejected band, relative to the standard nominal telephone impedance of 600Ω.

A telephone 42 having a tip-ring interface is connected to terminal 38 of adapter 18 via a tip-ring line 40. In the preferred embodiment, the telephone 42 is a full-duplex conferencing telephone such as the aforementioned CONFERENCEMASTER telephone. The CONFERENCEMASTER telephone is externally powered by a power supply 44, so that DC current along line 40 is not needed to power the telephone. Additionally, the CONFERENCEMASTER telephone applies an anti-aliasing filter to the incoming signal before digitizing the incoming signal in order to perform echo cancellation. In another embodiment wherein the conference telephone does not perform such filtering itself, a filter should be connected along line 40 for preventing the telephone 42 from receiving any out-of-band signaling tones between the PBX telephone 26 and the exchange 10.

As can be appreciated, when the switch 20a is in the conference position, all of the signaling features of the PBX telephone 26 are available to the user. Additionally, when switch 20a is in the conference position, the telephone 42 can be used to conduct high-quality full-duplex communication. The band-reject filter 18 prevents voice-band signals from the PBX telephone 26 from interfering with the echo cancellation function of the conferencing telephone 42. As has been mentioned, the band-reject filter 33 has a relatively high input impedance in the voice band, hence within that band, the tip and ring conductors of signal line 12 are properly terminated by the nominal 600Ω input impedance of the conference telephone 42. Any additional loading above the voice band that may be presented by the effective parallel connection of the PBX telephone 26 and the conference telephone 42 does not detract from satisfactory maintenance of the out-of-band signaling channel between the PBX telephone 26 and the exchange 10.

The attenuation or loss, L, provided by the bandreject filter 33 within the voice band, is preferably sufficient to render inaudible any voice-band signals from the PBX telephone 26 when switch 20a is in the conference position. Most preferably, the attenuation provided by the band-reject filter 33 is sufficient to maintain such voice-band signals below the first quantization level of the conferencing telephone 42, thereby essentially eliminating such signals from the communications.

Figure 2:
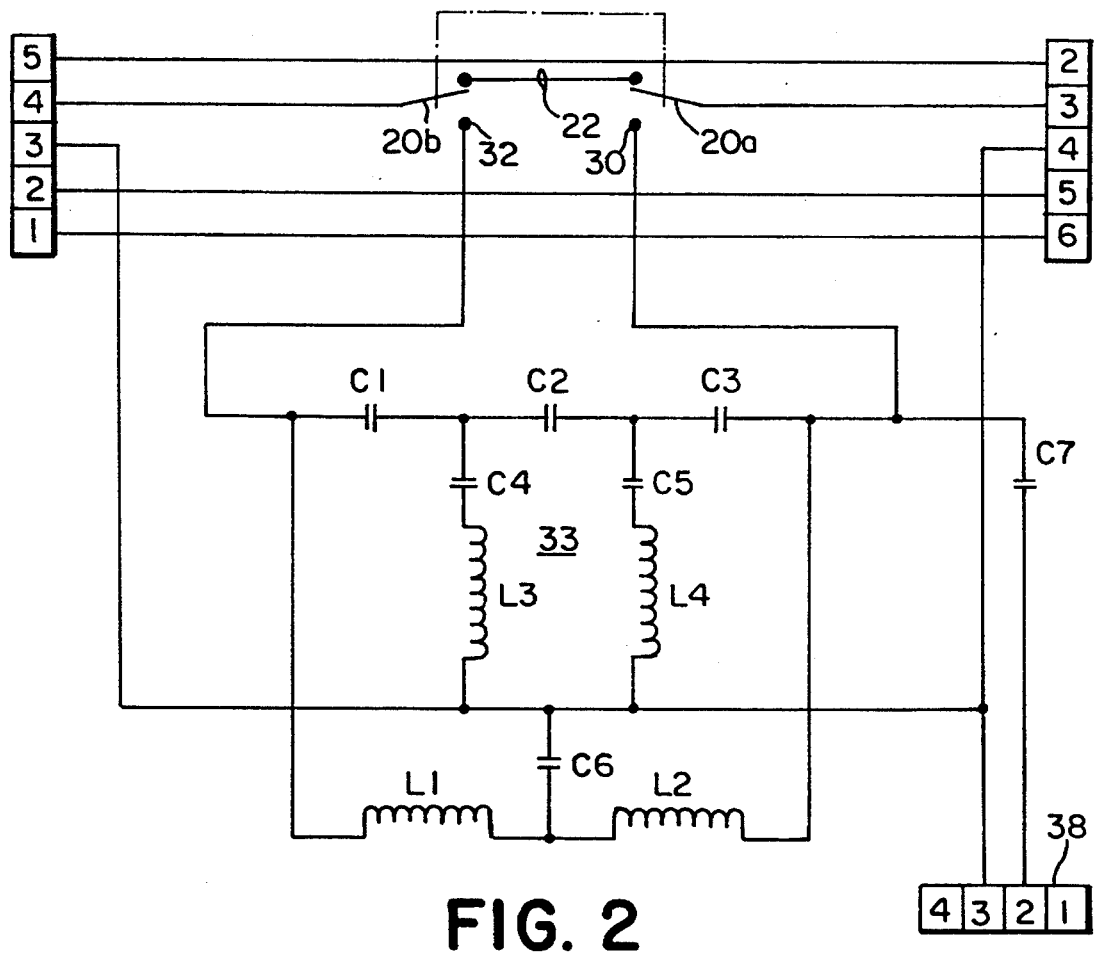
FIG. 2 is a schematic diagram of the adapter shown in FIG. 1.

Referring now to FIG. 2, there is shown a schematic diagram of a preferred embodiment of the adapter 18. Listed in Table I below are values for the circuit components shown in FIG. 2 that have provided good results.

TABLE I

| Component Values for FIG. 2 | |
|---|---|
| C1 | 0.056 µF |
| C2 | 0.033 µF |
| C3 | 0.022 µF |
| C4 | 0.1 µF |
| C5 | 0.27 µF |
| C6 | 8.2 µF |
| C7 | 1 µF |
| L1, L2 | 2 H |
| L3 | 22.5 NH |
| L4 | 18.4 NH |

In embodiments wherein the adapter circuit is disposed within a separate housing from the PBX telephone and the conferencing telephone, terminals 16 and 24 of the adapter device 18 may be embodied as standard modular telephone connectors, such as six-conductor female RJ11 plugs. Pins 1 and 2 of terminal 16 are directly connected to pins 6 and 5, respectively, of terminal 24. Pins 5 and 6 of terminal 16 are directly connected to pins 2 and 1, respectively, of terminal 24. The reversal of pin order in the connections between terminal 16 and 24 compensates for what is effectively a male-male connection between the exchange and the PBX telephone through the adapter 18. The direct connections between pins 1, 2, 5, and 6 of terminal 16 and the corresponding pins 6, 5, 2, and 1 of terminal 24 maintain the signaling channel through adapter 18 between the PBX telephone and the exchange in embodiments wherein a separate conducting path from the tip-ring is utilized for such a signaling channel.

Switches 20a and 20b are connected along the tip connection between pin 3 of terminal 16 and pin 4 of terminal 24 so that, in the normal position, a direct tip connection is established along conductor 22. As can be seen, the ring connection between pin 4 of terminal 16 and pin 3 of terminal 24 is maintained at all times.

Figure 3:
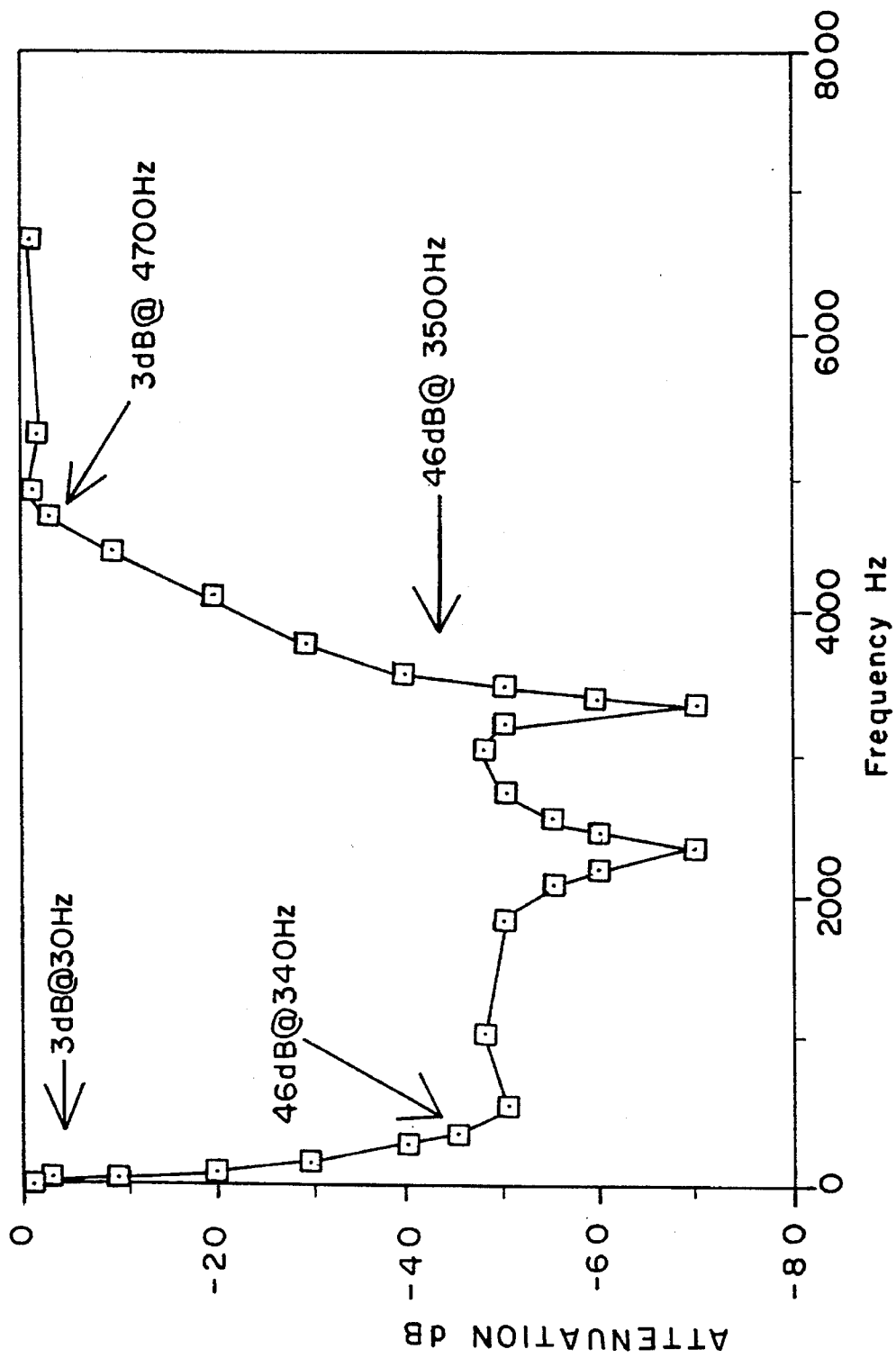
FIG. 3 is a frequency response graph of a band-reject filter of the type used in the adapter of FIG. 2.

When switches 20a and 20b are in the conference position, band-reject filter 33 is connected between terminals 16 and 24. The band-reject filter 33 is a passive LC network comprising a low-pass filter formed by inductors L1 and L2 and capacitor C6, in parallel with a high-pass filter formed by capacitors C1–C5 and inductors L3 and L4. The frequency response of a band-reject filter 33 having the circuit component values listed in Table I is shown in FIG. 3. As can be seen therein, the band-reject filter 33 provides 3 dB corner frequencies at 30 Hz and at 4700 Hz. An attenuation of greater than 40 dB is provided across the voice-band. For example, at about 340 Hz, the attenuation is 45 dB. At about 3500 Hz, the attenuation is 46 dB. Between the corner frequencies, still greater attenuation is provided. Minima are evident in the attenuation characteristic at 3350 H z, the resonant frequency of C4 and L3, and at 2257 H z, the resonant frequency of C5 and L4. Those two poles are provided near the upper edge of the voice-band to produce a sharp roll-off in the attenuation characteristic of the band-reject filter 33.

Referring back to FIG. 2, terminal 38, which connects to the conference telephone, is realized by a standard modular telephone connector, such as a female four-conductor RJ11 plug. The ring conductor from pin 4 of terminal 16 is maintained in connection at all times with the ring conductor, pin 3, of terminal 38. A 1 µF capacitor, C7, is connected in series between the tip conductor, pin 2 of terminal 38, and terminal 30 of the adapter circuit. The capacitor C7 blocks DC current along the tip-ring connection to the conferencing telephone 42 so that the hook status seen by the exchange 10 is determined by the PBX telephone 26. The specific configuration of the band-reject filter 33 can differ from that shown in FIG. 2. The functions provided by the band-reject filter 33 can be provided by numerous other types of passive, or active, two-port networks. However, the features of band-reject filter 33 that are of primary importance are that it provides attenuation of voice-band signals between the PBX telephone and the private exchange, passes DC power to the PBX telephone, and that it provides a relatively high input impedance in the voice-band so that the circuit loading in that range is determined by the input impedance of the conferencing telephone. The band-reject filter provides selective attenuation of signals produced by the PBX telephone so that the adapter circuit can provide a composite signal, including signals from the conference telephone and the filtered signal from the PBX telephone, to the exchange.

It will also be appreciated that the adapter circuit of the present invention can be used to connect a full-duplex conferencing telephone, or indeed any tip-ring voice-band device, in tandem with a standard telephone. For example, there are standard telephones, commonly known as "feature phones", that incorporate a variety of features such as speed dialing, redial, and the like, under the control of an embedded microcontroller. As an alternative to the PBX adapter function described herein, a user may wish to utilize a full-duplex conferencing telephone in tandem with a tip-ring "feature phone". In such an embodiment, the local exchange, such as a central office, would fulfill the role of the PBX exchange in the above-described embodiments. In order to provide compatibility with tip-ring feature phones, it may be desirable to employ four-conductor female RJ11 plugs in place of the six-conductor plugs shown in the embodiment of FIG. 2. Of course, in embodiments wherein the adapter circuit is built into the housing of one of the telephone devices, the connection terminals from the adapter circuit to the host telephone device are provided by direct internal connections so that RJ11 connectors are not needed to connect with the host telephone.

In other alternative embodiments, it may be desirable to use an adapter circuit to connect other types of two-wire telephone. devices, such as a modem or facsimile machine in tandem with a PBX telephone or feature telephone, instead of a full-duplex conference telephone as has been described. In such an embodiment, the PBX or feature telephone may be used to establish a connection, and then the modem or facsimile machine can be manually switched into the data transmission mode of operation. Typically, the PBX telephone will be operated in the hands-free mode for the remainder of the call in order to maintain off-hook status and to maintain a signaling channel with the exchange. The band-reject filter will prevent any ambient room audio picked up by the PBX telephone from interfering with the modem or facsimile communication. Additionally, the band-reject filter will also prevent the modem or facsimile signals from being reproduced by the loudspeaker of the PBX telephone.

In yet other alternative embodiments, the selection of "normal" and "conference" configurations can be made by automatic circuitry, rather than by manual switches 20a and 20b as shown. For example, the adapter circuit may include decoding circuitry for monitoring and decoding selected signals along the signaling channel between the PBX telephone 26 and the exchange 10. Then, in response to detection of a predetermined signal, such as the activation of a particular feature of the PBX telephone, the switches 20a and 20b are automatically activated to connect the band-reject filter in-line with the PBX telephone.

In an embodiment wherein a data transmission device, such as a modem, is to be employed in tandem with another telephone, automatic circuitry may be employed to detect data transmission signals and to automatically activate the band-reject filter.

The band-reject filter can possess a transfer characteristic other than that shown in FIG. 1. For example, it may be desirable to provide a filter which only attenuates a portion of the voice band, or one or more other portions of the spectrum between the PBX telephone and the exchange. Additionally, the bandreject filter may possess asymmetrical frequency characteristics in one direction of transmission relative to the other direction. Moreover, the attenuation provided by the band-reject filter may be less than that shown so that the signals between the adapter circuit and the exchange are then a mixture of signals from the PBX telephone and from the connected non-PBX telephone.

In either a PBX or standard telephone system, it may be desirable to provide the adapter circuit 18 with the ability to pass dual-tone multi-frequency (DTMF) signals, or so-called "touch tones", from the PBX telephone or the "feature phone" to the exchange when the selector switch of adapter 18 is in the conference position. Such a capability may be desired within PBX systems employing DTMF tones, or to provide the user with the ability to use the keypad of either the "feature phone" or the conferencing telephone to access such services as voice mail during a voice communication. That capability can be provided by connecting a DTMF bypass circuit in parallel with the band-reject filter 33 in adapter 18. A preferred arrangement of such a bypass circuit is shown in FIG. 4.

Figure 4:
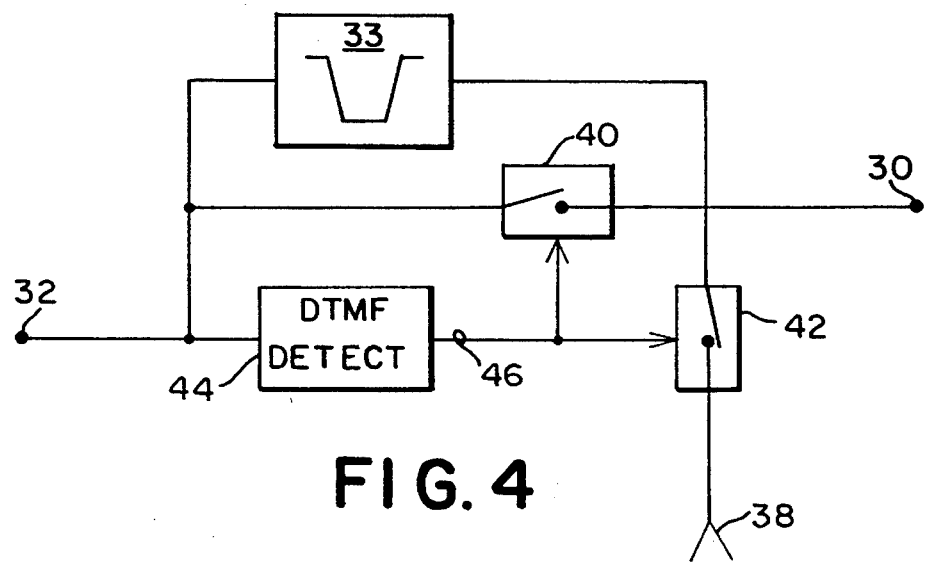
FIG. 4 is a functional block diagram of an DTMF bypass circuit for use in an adapter device in accordance with the present invention.

Referring now to FIG. 4, a normally-open logic-controlled switch 40 is adapted for connection between contacts 30 and 32 of the adapter 18. A normally-closed, logic-controlled switch 42 is connected between contact 30 and the tip conductor of terminal 38. A DTMF detector 44 is connected to monitor signals at contact 32 of the adapter 18. When the DTMF detector 44 senses DTMF tones, the DTMF detector 44 asserts a logic signal over line 46 to switches 40 and 42. Line 46 is connected to the control inputs of switches 40 and 42. Thus, when a logic signal is asserted by the DTMF detector 44, switch 40 is closed and switch 42 is opened, whereby DTMF signals transmitted by the PBX telephone are connected directly through the adapter circuit 18 without being attenuated by the band-reject filter 33. When no DTMF tones are sensed by DTMF detector 44, switch 40 is opened and switch 42 is closed, so that full-duplex communication can continue to be conducted by the user of the conferencing telephone. Other arrangements for providing a DTMF bypass circuit, such as by decoding the DTMF tones and then regenerating them on opposite sides of the band-reject filter 33, can also be utilized.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. An adapter circuit for connecting a first telephone device and a second telephone device with a telephone communication system, wherein the first telephone device is configured to produce first voice band signals and control signals compatible with the telephone communication system, and the second telephone device is configured to produce second voice band signals, the adapter circuit comprising:

a first terminal for connection with said first telephone device;

a second terminal for connection with said second telephone device;

a third terminal for connection with said communication system;

first connection means for connecting said second terminal with said third terminal, and for allowinq the second voice band signals to be conducted between the second telephone and the telephone communication system;

second connection means for connecting said first terminal with said third terminal;

selective attenuation means, located along said second connection means, for selectively attenuating said first voice band signals according to a selected frequency characteristic, and for allowing control signals to be conducted along said second connection means between the first telephone device and the telephone communication system.

2. The adapter circuit of claim 1 wherein said selective attenuation means comprises switch means for selectively connecting said selective attenuation means along said second connection means and between said first terminal and said third terminal.

3. The adapter circuit of claim 2 wherein said selective attenuation means comprises a filter for attenuating said first voice band signals along said second connection means.

4. The adapter circuit of claim 3 wherein said filter comprises a band-reject filter for attenuating said first voice band signals.

5. The adapter circuit of claim 3 wherein said filter applies attenuation to said first voice band signals sufficient to render said first voice band signals substantially inaudible.

6. The adapter circuit of claim 4 wherein said communication system is a private branch exchange.

7. The adapter circuit of claim 6 wherein said private branch exchange is of the type employing a signalling channel for communicating the control signals with said first telephone device, and said signalling channel employs frequencies that are outside of the voice band.

8. The adapter circuit of claim 6 wherein said private branch exchange is of the type having a first conductive path for conducting voice signals between said private branch exchange and said first telephone device, and a second conductive path for conducting control signals between said private branch exchange and said first telephone device; and wherein said switch means is operative to connect said filter along said first conductive path.

9. The adapter circuit of claim 7 wherein said switch means is responsive to said signalling channel for connecting said selective attenuation means along said second connection means.

10. The adapter circuit of claim 8 wherein said switch means is responsive to said signalling channel for connecting said selective attenuation means along said second connection means.

11. The adapter circuit of claim 1 wherein said first telephone device includes a telephone having an interface adapted for compatibility with the telephone communication system and wherein said second telephone device includes a conferencing telephone having a tip-ring interface.

12. The adapter circuit of claim 11 wherein said conferencing telephone includes an echo canceler for providing full-duplex conversation.

13. The adapter circuit of claim 11 wherein said communication system is a private branch exchange.

14. The adapter circuit of claim 13 wherein the private branch exchange is configured to utilize out-of-band control signalling, and wherein said attenuation means is arranged to substantially eliminate transmission of voice band signals from the private branch exchange to the first telephone and to substantially eliminate transmission of voice band signals from the first telephone to the private branch exchange while maintaining out-of-band control signalling between the private branch exchange and the first telephone.

15. The adapter circuit of claim 1 wherein said circuit is housed within a selected one of said first and second telephone devices.

16. The adapter circuit of claim 1 wherein a selected one of said first and second telephone devices comprises a modem.

17. The adapter circuit of claim 1 wherein a selected one of said first and second telephone devices includes a facsimile machine.

18. The adapter circuit of claim 1 wherein the second telephone device is incapable of generating control signals compatible with the telephone communication system.

19. The adapter circuit of claim 18 wherein said selective attenuation means is arranged to render said first voice band signals substantially inaudible.

20. The adapter circuit of claim 19 wherein said selective attenuation means is bi-directionally operative to permit control signals to be conducted between the third terminal and the first terminal.

21. The adapter circuit of claim 19 wherein said control signals are provided at a frequency outside of the first voice band signals.

22. The adapter circuit of claim 21 wherein said control signals are provided from the first telephone at a frequency greater than 4700 Hz and are conducted upon the first voice band signals.

23. The adapter circuit of claim 22 wherein said attenuation means is configured to attenuate signals having frequencies between about 300 Hz to about 3500 Hz.

24. The adapter circuit of claim 22 wherein said attenuation means is configured to attenuate signals having frequencies of between about 30 Hz to about 3500 Hz.

25. The adapter circuit of claim 19 wherein said attenuation means consists essentially of a passive filter.

26. The adapter circuit of claim 25 wherein said attenuation means provides attenuation of greater than 40 dB.

27. The adapter circuit of claim 1 wherein said second connection means is compatibly configured for conducting control signals between the first terminal and the third terminal independent of whether the telephone communication system is arranged to utilize out-of-band control signalling or whether the telecommunication system is arranged to utilize separate conductors for voice and control signals.

28. An adapter for interfacing a first telephone device with a second telephone device and an exchange, wherein the second telephone is configured to generate voice band signals within a voice channel and control signals within a signalling channel, the adapter comprising:

a first terminal for connecting to the exchange;

a second terminal for connecting to the first telephone device;

a third terminal for connecting to the second telephone device;

a filter for providing attenuation of the voice channel, said filter having first and second ports, the second port being connected to said second terminal; and switching means connected to said first and third terminals and to said filter, said switching means being formed for switching between (i) a first position wherein said first terminal is connected to said third terminal and (ii) a second position wherein the first port of said filter is connected to said third terminal and the second port of said filter is connected to said first terminal, whereby said filter can be selectively interconnected between the second telephone device, and the exchange so as to attenuate voice band signals provided by the second telephone device to the exchange while maintaining transmission of the control signals within the signalling channel.

29. An adapter as set forth in claim 28 wherein the signalling channel is located at a higher range of frequencies than the voice channel, and said filter comprises conducting means for conducting the control signals between the second telephone and the exchange.

30. An adapter as set forth in claim 28 wherein said filter is formed to provide a high impedance in the voice-band at the second port relative to a standard telephone impedance.

31. An adapter as set forth in claim 30 wherein said filter is formed to provide an impedance in the voice-band in excess of 600Ω at the second port.

32. An adapter as set forth in claim 28 wherein said filter comprises a band-reject filter for attenuating signals in the voice-band.

33. An adapter for interfacing a first telephone device with a second telephone device and an exchange, comprising:

a first terminal for connecting to the exchange;

a second terminal for connecting to the first telephone device;

a third terminal for connecting to the second telephone device;

a filter for providing attenuation of signals within a selected band, said filter having first and second ports, the second port being connected to said second terminal;

switching means connected to said first and third terminals and to said filter, said switching means being formed for switching between (i) a first position wherein said first terminal is connected to said third terminal and (ii) a second position wherein the first port of said filter is connected to said third terminal and the second port of said filter is connected to said first terminal, whereby said filter can be selectively interconnected between the second telephone device, and the exchange so as to attenuate signals provided by the second telephone device to the exchange; and a DTMF bypass circuit connected in parallel with said filter for allowing the second telephone to transmit a DTMF signal toward the exchange and for preventing attenuation of said DTMF signal by said filter.

* * * * *